United States Patent Office 3,448,061
Patented June 3, 1969

3,448,061
PROCESS FOR THE MANUFACTURE OF
CATALYSTS SUPPORTED ON CARRIERS
OF LARGE DIMENSIONS
Georg Mika, Frankfurt am Main, Germany, assignor to
Farbwerke Hoechst Aktiengesellschaft vormals Meister
Lucius & Bruning, Frankfurt am Main, Germany, a
corporation of Germany
No Drawing. Filed Nov. 1, 1966, Ser. No. 591,114
Claims priority, application Germany, Nov. 11, 1965,
F 47,646
Int. Cl. B01j 11/06
U.S. Cl. 252—456   4 Claims

ABSTRACT OF THE DISCLOSURE

A process for manufacturing improved catalysts for the oxidation of sulfur dioxide to sulfur trioxide is shown. Preshaped, porous carriers consisting substantially of silica are impregnated in a solution consisting essentially of vanadium and alkali and having a defined pH in order to improve the mechanical strength characteristics of the impregnated catalyst. The impregnating solution contains alkali in an amount exceeding the stoichiometric amount required for formation of metavanadate. The excess alkali above the molar ratio $V_2O_5:Me_I^+$ of 1:2 is a compound selected from the group consisting of alkali compounds of sodium, potassium, rubidium and cesium and the alkali compound is selected to maintain the pH of the impregnating solution within the range 6.5 to 9. Impregnated catalyst is then dried. In a preferred embodiment the carriers to be impregnated are arranged in upright position in the direction of their longitudinal axis and are impregnated in a circulating solution.

---

The present invention relates to a process for the manufacture of catalysts for the oxidation of sulfur dioxide to sulfur trioxide, supported on carriers of large dimensions capable of being closely packed with orientation, in which preshaped tubular porous carriers consisting substantially of silica are impregnated with a vanadate solution containing alkali in an amount exceeding the amount of alkali necessary for the formation of metavanadate, and the carriers thus impregnated are dried.

In heterogeneous gas catalysis there have been used catalysts supported on carriers that can be heaped up without orientation, for example, grains, full cylinders, rings or pellets.

It has been described in German Patent No. 953,603 to arrange tubular carriers supporting a catalyst for heterogeneous gas catalysis so as to form an oriented close packing, the longitudinal axis of the carriers having advantageously the same direction as the stream of the reaction gases. The catalyst carriers may be individual tubes or may have the shape of cylindrical or prismatic bodies provided with a plurality of axially parallel channels. The length of the catalyst carriers reaches the height of a catalyst layer heaped up without orientation in a hurdle catalyst reactor, for example 500 mm., and the interior diameter of the individual axially parallel channels is about 3 to 15 mm.

To obtain a close packing the catalyst carriers must be free from bends and other deformations.

The catalyst carriers are made by extrusion. The catalytically active material may be united with the carrier by compression during extrusion or may be applied by subsequent impregnation.

It has proved advantageous in the manufacture of the above catalysts supported on carriers of the above type first to produce the porous carrier which consists substantially of silica, then to impregnate it with a solution containing vanadium, alkali and other additives, if desired, in appropriate amounts and ratios, and finally to dry the carrier thus impregnated.

As is known, highly active vanadium catalysts contain alkali in an amount exceeding the amount of alkali necessary for the formation of metavanadate, for example up to a molar ratio of $V_2O_5:Me_I^+$ of 1:4 and more ($Me_I$=Na, K, Rb, Cs). The required impregnating solution is obtained, for example, by dissolving vanadium pentoxide in alkali liquor, generally sodium or potassium hydroxide solution, while adding the amount of alkali in excess of the stoichiometric ratio $V_2O_5:Me_I^+$ of 1:2 in the form of the hydroxide thereof. Such solutions are strongly alkaline and have a pH value far above 10.

Large carriers consisting substantially of silica which have been impregnated with solutions of the above composition undergo deformation on drying or at working temperature and may even break.

The present invention provides a process which enables the above disadvantages such as deformation and breaking of the catalyst carriers on drying or at working temperature to be avoided.

The present invention provides a process for the manufacture of catalysts for the oxidation of sulfur dioxide to sulfur trioxide, supported on carriers of large dimensions capable of being closely packed with orientation, in which preshaped porous carriers which consist substantially of silica are impregnated with a solution containing predominantly vanadium, and alkali in an amount exceeding the amount of alkali necessary for the formation of metavanadate, said process comprising impregnating the carriers with a solution containing the amount of alkali in excess of a ratio of $V_2O_5:Me_I^+$ of 1:2 ($Me_I$=Na, K, Rb, Cs) in the form of an alkali metal compound which is selected such that the impregnating solution has a pH value within the range of 6.5 to 9, preferably 7.5 to 8.5, and drying the carriers thus impregnated.

The amount of alkali in excess of a stoichiometric ratio $V_2O_5:Me_I^+$ of 1:2 may be added, for example, in the form of an alkali metal salt of a strong acid. Alternatively, the impregnating solution may be prepared with an excess amount of alkali metal hydroxide and then acid may be added until the desired pH value has been reached. The anion of the alkali metal salt, or the acid, respectively, is substantially noncritical. Advantageously sulfates or sulfuric acid are used. Salts or acids the anionic constituent of which may form volatile compounds with vanadium, that is in the first place halides, above all chlorides, should not, however, be used.

For a uniform distribution of the catalytically active material in the carrier, it is advantageous to carry out the impregnation not in a solution at rest as has hitherto been done, since the concentration of catalyst may decrease considerably from the outside to the interior of the carrier and may be, for example, 7.5% $V_2O_5$ on the outside and 3.5% $V_2O_5$ in the interior, whereby the effectiveness of the catalyst is considerably reduced. Impregnation is therefore advantageously carried out with the use of a circulating solution which flows upward through the carriers, which are in upright position, in the direction of their longitudinal axis. By proceeding in this manner the vanadium is distributed uniformly over the whole carrier, provided that the pore structure is homogeneous.

To ensure that the uniform distribution so obtained is not changed by the subsequent drying, it is advantageous to perform the drying process rapidly and arrange the impregnated catalyst carriers such that the drying medium has access to the whole surface. Good results are obtained, for example, by drying with circulating hot air.

The process of the invention yields catalyst-impregnated carriers of large dimensions capable of being closely packed with orientation, which are neither deformed nor impaired at the temperatures used in the oxidation of sulfur dioxide and which, because of the uniform distribution of the vanadium, enable a high conversion rate of up to about 98.5% to be obtained with only a small pressure loss in the catalyst layer.

The following example serves to illustrate the invention, but is not intended to limit it.

Example

By reacting in an aqueous solution 75 g. vanadium pentoxide with 46.3 g. potassium hydroxide, a potassium vanadate solution with a molar ratio of $V_2O_5$:KOH of 1:2 was prepared. By adding 67.8 g. potassium sulfate, the molar ratio was increased to 1:3.9. The pH value of the solution which had been made up to 1 liter was adjusted to 7.7 by adding a small amount of potassium hydroxide solution.

A great number of large carriers of the above type was arranged in a cylindrical vessel to form an upright bundle and impregnated with the alkali vanadate solution described above. The solution which had a temperature of 20 to 50° C. was recirculated upward through the channels by a pump for about 2 to 3 hours.

After discharging the impregnating solution, an intense air stream of a temperature of 110 to 200° C. was conducted through the channels in the same direction of flow. The catalyst carriers thus treated were dry after 20 to 30 minutes. They were dimensionally stable and contained the alkali vanadate in a substantially uniform concentration.

What is claimed is:

1. In a process for the manufacture of catalyst for the oxidation of sulfur dioxide to sulfur trioxide wherein a preshaped, porous carrier consisting substantially of silica is impregnated with a solution consisting essentially of vanadium and alkali, the latter in an amount exceeding the stoichiometric amount for formation of metavanadate, the improvement which comprises: strengthening the catalyst by impregnating said carrier with a solution containing alkali in excess of the molar ratio $$V_2O_5:Me_I^+ = 1:2$$

the alkali in excess of said ratio being selected from the group consisting of alkali compounds of sodium, potassium, rubidium and cesium, said alkali compound being selected to maintain the pH of the impregnating solution within the range 6.5 to 9; and drying the carrier thus impregnated.

2. A process as claimed in claim 1 wherein the solution is adjusted to a pH value within the range of 7.5 to 8.5.

3. A process as claimed in claim 1 wherein the carriers are impregnated with a circulating solution which flows upward through the carriers which are in upright position in the direction of their longitudinal axis.

4. The process recited in claim 1 wherein said preshaped, porous carrier is tubular in shape.

References Cited

UNITED STATES PATENTS 3,216,953  11/1965  Krempff _____ 252—456
3,313,840  4/1967  Kosel et al. _____ 252—456 X

FOREIGN PATENTS 638,031  5/1950  Great Britain.
45,274  11/1961  Poland.

DANIEL E. WYMAN, Primary Examiner.

C. F. DEES, Assistant Examiner.

U.S. Cl. X.R.

23—175